Sept. 14, 1926.
W. GOLDSTEIN
1,599,710
ANTISKID DEVICE FOR AUTOMOBILES
Filed March 23, 1926    2 Sheets-Sheet 2
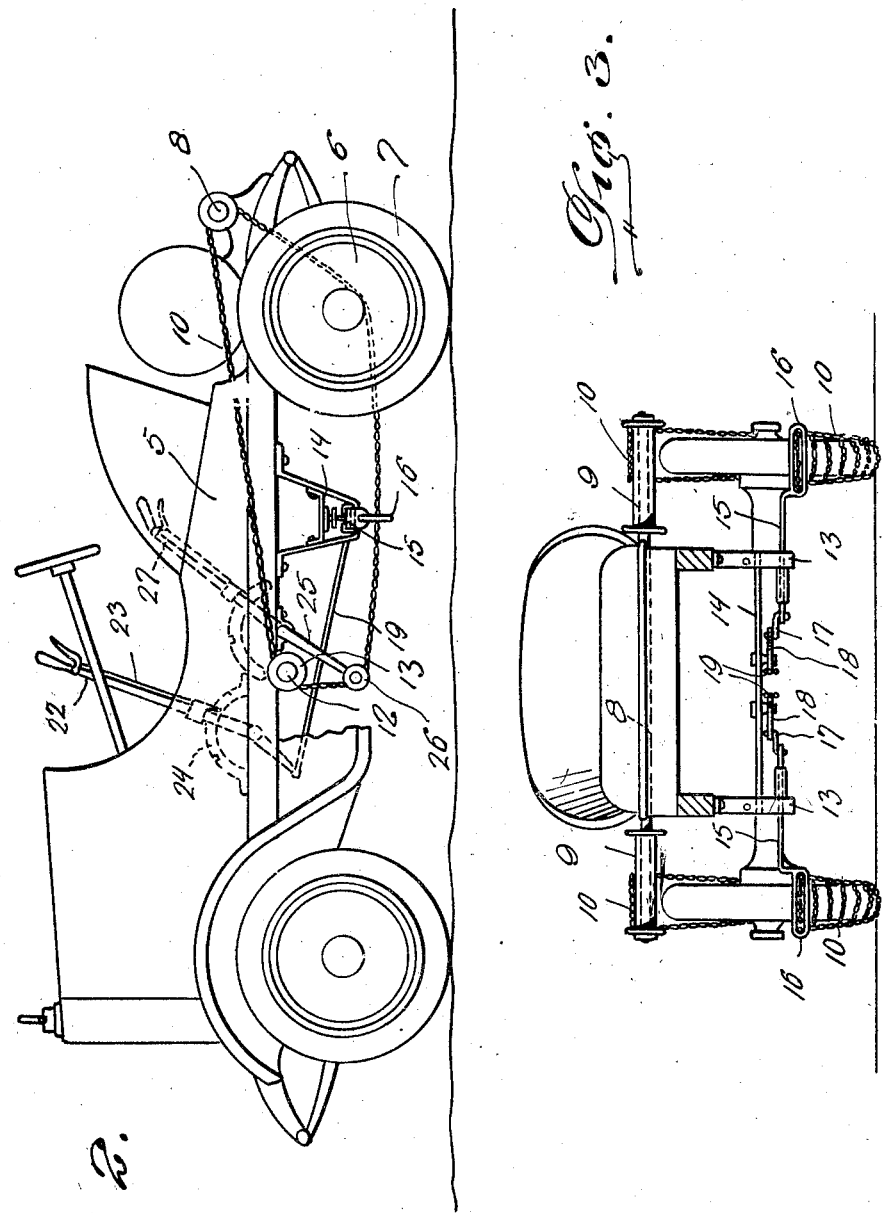
Inventor
W. Goldstein,
By Clarence A. O'Brien
Attorney Patented Sept. 14, 1926.

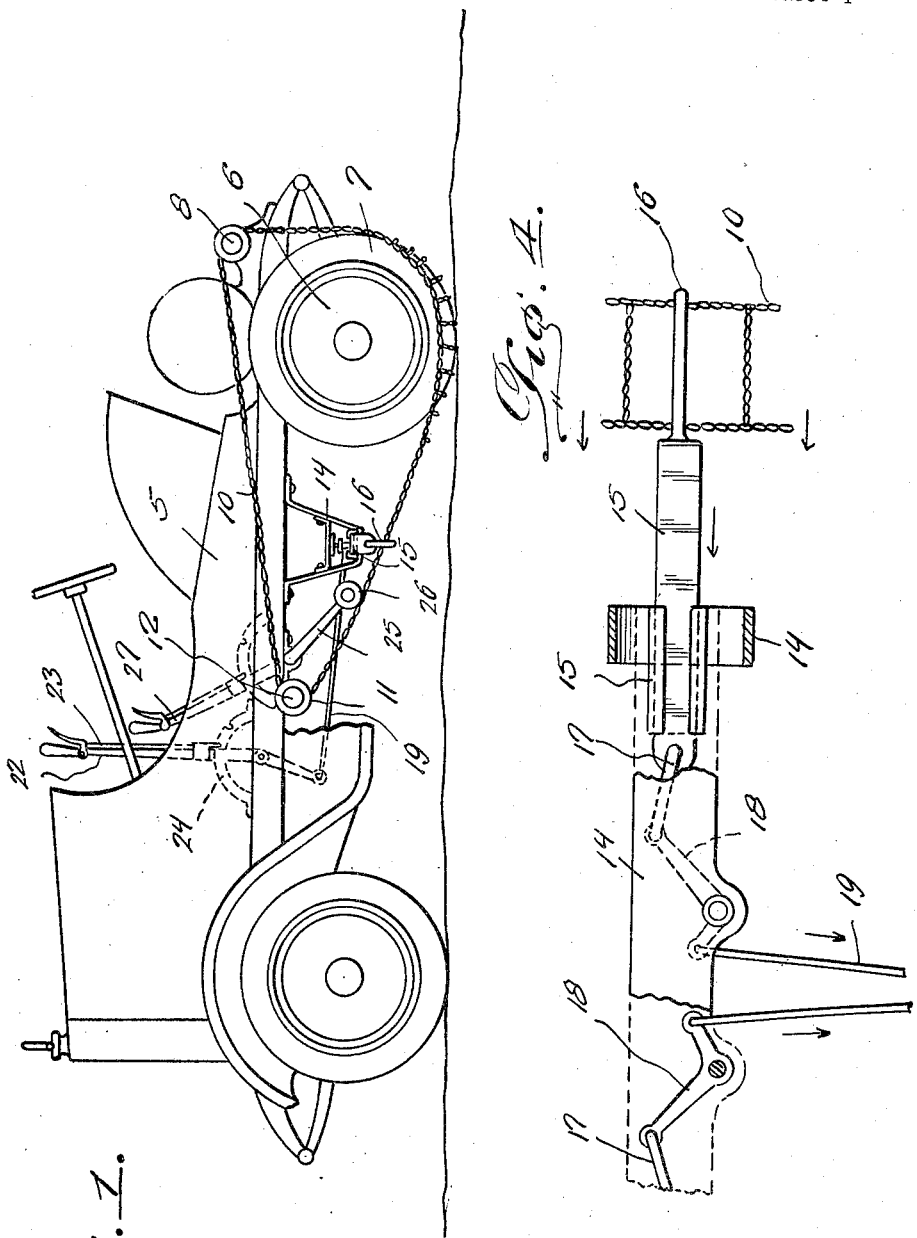

1,599,710

UNITED STATES PATENT OFFICE.

WILLIAM GOLDSTEIN, OF WILKES-BARRE, PENNSYLVANIA.

ANTISKID DEVICE FOR AUTOMOBILES.

Application filed March 23, 1926. Serial No. 96,775.

This invention relates to an anti-skid device adapted for permanent association with automobiles of all types, and has for its primary object to provide means for moving a pair of endless chains at the opposite sides of the vehicle into position around the rear wheels of the vehicle in order that the wheels in rotating will engage upon the chains and cause the movement of the same around the wheels during the rotation thereof for preventing the skidding of the machine upon wet or icy streets, and for also enabling a machine to pull out of the mud or ditch, should the occasion arise.

A further object of the invention is to provide means directly adjacent the operator's seat of the vehicle for moving said endless traction chain into or out of engagement with the rear wheels during the movement of the machine, and without requiring the application of tire fitting anti-skid chains which is now necessary for anti-skid purposes.

A further object of the invention resides in the provision of an anti-skid mechanism of this character that may be readily and relatively inexpensively associated with all types of automobiles now upon the market, and of such a nature as to permit of the ready operation of the device without requiring any skill whatever upon the part of the operator.

Other objects will become apparent as the nature of the invention is better understood, the same comprising the novel form, combination, and arrangement of parts hereinafter more fully described, shown in the accompanying drawing and claimed.

In the drawings wherein like reference characters indicate corresponding parts throughout the several views:

Figure 1 is a fragmentary side elevation of a miniature form of automobile with which is associated my improved anti-skidding mechanism, said mechanism being shown in operable position.

Figure 2 is a similar view disclosing the mechanism in inoperative position.

Figure 3 is a vertical section taken through the automobile at a point directly forwardly of the driver's seat shown, and looking rearwardly thereof, and Figure 4 is an enlarged fragmentary view partly in section, and partly in top plan for more clearly disclosing the means for moving the chains toward or away from the rear wheels of the machine.

Now having particular reference to the drawings, 5 indicates generally an automobile, and 6 the rear traction wheels thereof upon which are mounted the conventional tires 7. In carrying out my invention I mount upon the rear ends of the machine a transversely extending bar 8, the ends of which project slightly beyond the rear wheel at a point inwardly of the rear side thereof as clearly disclosed in Figures 1, 2 and 3. This bar is suitably anchored to the frame of the machine and mounted upon the opposite ends are relatively elongated flanged rollers 9—9 trained over which are endless chains 10—10 of predetermined length according to the type of the machine with which the device is to be associated. These chains extend around the rear axle of the machine and thence forwardly thereof and are in turn again trained over similar rollers 11 that project laterally outwardly of the machine frame, bars being mounted for free rotation upon stub bars 12, that are suitably anchored to the frame bars of the machine preferably forwardly of the driver's seat thereof.

Bolted or otherwise suitably secured to the under side of the machine frame bars rearwardly of the rollers 11 are depending triangular shaped hangers 13—13 that are interconnected by a cross strip 14, the ends of which are disposed between the legs of the hangers in spaced relation with the bottom thereof as clearly disclosed in Figures 1 and 2. Slidable within spaced guide strips 15 upon the top side of the bottom of each hanger is an arm 15 that projects outwardly of the respective hanger and is formed at its outer end with a relatively elongated downwardly offset ring 16 through which freely moves the endless chain 10 at the adjacent side of the machine in order that the outward projection of said arm will force the chains outwardly upon the roller support for moving the lower flight into the direction path of the rear wheel whereby said rear wheels will grip the chains and cause the same to move over the tires in a manner as clearly disclosed in Figures 1 and 3 for providing traction means between the tires and road surface in preventing the skidding of the machine and for increasing traction in order that the machine may be extricated from ruts, mud, and the like.

The inner ends of the arms 15 are connected by links 17 to certain arms of bell cranks 18 that are pivoted to the under side of the hanger connecting bar 14 and to the other inner arms of which are connected rods 19 that extend forwardly beneath the machine and are loosely connected to the lower ends of a hand lever 20 preferably pivotally mounted beneath the floor board of the machine and extending upwardly therefrom into position adjacent the driver's seat of the vehicle. Said lever carries a detent 23 for cooperative relation with a notched segment 24 mounted upon the floor board so that said lever will be maintained in position for retaining the arms 15 inwardly or outwardly with respect to their hangers.

In order that the endless chains 10—10 may be tightened when in inoperative position to prevent dragging of the same upon the ground there is arranged upon the under side of the machine rearwardly of the rollers 11 a cross shaft, the opposite ends of which are formed with crank arms 25 that carry rollers 26 for engagement with the chains as shown in Figures 1 and 2. Said shaft is operable through medium of a hand lever 27 that is attached to the shaft and extends upwardly also adjacent the driver's seat of the vehicle. A pull upon this lever in one direction will force the arms 25 downwardly to cause the tightening of the chains as shown in Figure 1. The lever carries a suitable detent cooperable with a segment upon the floor board or other convenient point for maintaining the same in operative or inoperative position.

It will thus be seen that I have provided a highly novel, simple, and efficient form of anti-skid device for permanent association with motor vehicles that is well adapted for all the purposes heretofore designated, and even though I have herein shown and described the invention as comprising certain detail elements of construction, it is nevertheless to be understood that minor changes may be made therein without affecting the spirit and scope of the appended claims.

Having thus described the invention, what I claim as new and desire to secure by Letters Patent is:—

1. In an anti-skid mechanism for automobile wheels, an endless chain arranged upon each side of the machine at the rear end thereof, means for supporting each chain inwardly of the respective wheel, and means for forcing the chain outwardly to engage around said wheel.

2. In an anti-skid mechanism for automobile wheels, an endless chain arranged on each side of the machine at the rear end thereof and extending around the rear axle, means for supporting the chain at the inner side of the adjacent wheel at points forwardly and rearwardly thereof, and means for moving the chain to position around the wheel.

3. In an anti-skid mechanism for automobile wheels, an endless chain arranged upon each side of the machine at the rear end thereof and around the axle, means for supporting the chain at points forwardly and rearwardly of the axle normally at the inner side of the adjacent wheel, the chain being of a length normally permitting the lower flight to rest upon the road and means for moving the chain outwardly of the machine so that said lower flight will be pulled beneath the wheel during movement of the machine.

4. In an anti-skid mechanism for automobile wheels, an endless chain arranged upon each side of the machine at the rear end thereof and around the axle, means for supporting the chain at points forwardly and rearwardly of the axle normally at the inner side of the adjacent wheel, the chain being of a length normally permitting the lower flight to rest upon the road and means for moving the chain outwardly of the machine so that said lower flight will be pulled beneath the wheel during movement of the machine, and means for raising the lower flight of the chain when not in use.

5. In an anti-skid mechanism for automobile wheels, an endless chain arranged upon each side of the machine at the rear end thereof, means for supporting the chain around the axle inwardly of the adjacent wheel and at points forwardly and rearwardly of the axle, said chain being of a length to permit the lower flight to rest upon the road and means for moving the chain outwardly of the machine so that said lower flight will be pulled beneath the wheels during movement of the machine.

6. In an anti-skid device for automobile wheels, an endless chain arranged around the rear axle of the machine at the inner side of one of the wheels supported thereon, and being of sufficient length to permit its engagement around the wheel and means for moving the chain to position to be forcibly arranged around the wheel.

In testimony whereof I affix my signature.

WILLIAM GOLDSTEIN.